United States Patent [19]

Cassarly et al.

[11] Patent Number: 5,664,863
[45] Date of Patent: Sep. 9, 1997

[54] COMPACT UNIFORM BEAM SPREADER FOR A HIGH BRIGHTNESS CENTRALIZED LIGHTING SYSTEM

[75] Inventors: William J. Cassarly, Richmond Hts.; John M. Davenport, Lyndhurst; Richard L. Hansler, Pepper Pike, all of Ohio; Timothy J. Mazies, Oak Forest, Ill.

[73] Assignees: General Electric Company, Schenectady, N.Y.; Federal Signal Corporation, Oakbrook, Ill.

[21] Appl. No.: 382,717

[22] Filed: Feb. 2, 1995

[51] Int. Cl.⁶ ...................................................... F21V 7/04
[52] U.S. Cl. ........................... 362/32; 362/31; 362/293; 362/328
[58] Field of Search ............................... 362/26, 32, 35, 362/61, 80, 293, 328, 31

[56] References Cited

U.S. PATENT DOCUMENTS

| | | | |
|---|---|---|---|
| 4,799,753 | 1/1989 | Breitbarth et al. | 362/32 X |
| 5,239,230 | 8/1993 | Mathews et al. | 313/571 |
| 5,257,168 | 10/1993 | Davenport et al. | 362/32 |
| 5,260,686 | 11/1993 | Kuo | 362/32 X |
| 5,278,731 | 1/1994 | Davenport et al. | 362/32 |
| 5,341,445 | 8/1994 | Davenport et al. | 385/39 |

FOREIGN PATENT DOCUMENTS

| | | |
|---|---|---|
| 559914A1 | 9/1993 | European Pat. Off. . |
| 38798 | 10/1993 | Japan . |
| 700829 | 12/1953 | United Kingdom . |
| 1570684 | 7/1980 | United Kingdom . |
| 1584690 | 2/1981 | United Kingdom . |
| WO82/01942 | 6/1982 | WIPO . |

OTHER PUBLICATIONS

Examiner's Search Report to the Comptroller under Section 17 on Application No. GB 9601359.4.

*Primary Examiner*—Stephen F. Husar
*Attorney, Agent, or Firm*—George E. Hawranko

[57] ABSTRACT

A beam spreading device for use with a centralized lighting system and which can be applied to emergency vehicle lighting applications achieves a beam pattern light output which is essentially continuous over an output range of plus and minus 45 degrees from a center point. The beam pattern light output also has a predefined height associated therewith. The beam spreading device is constructed so as to have a curved surface which mixes the light travelling therethrough so as to achieve the continuous light output. Side wall surfaces of the beam spreading device provide for total internal reflectance properties of the beam spreading device. In one embodiment, a color wheel can be interposed between the output of optical fibers which transmit the light from the centralized light source to the necessary remote location, and the beam spreading device. The color wheel provides the ability to generate different color light outputs from a single light source. In another embodiment, the side wall portions are curved to enable significant packaging depth advantages.

14 Claims, 5 Drawing Sheets

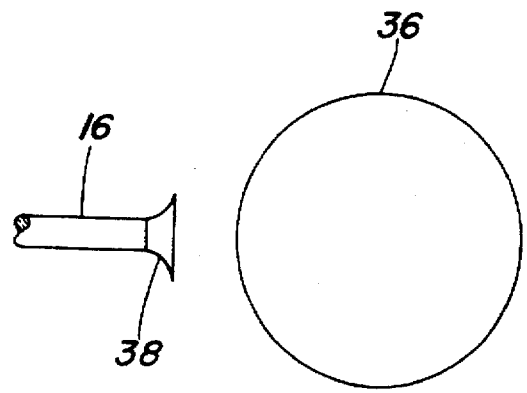
Fig. 6
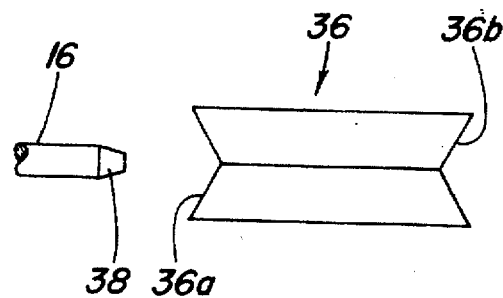
Fig. 6A
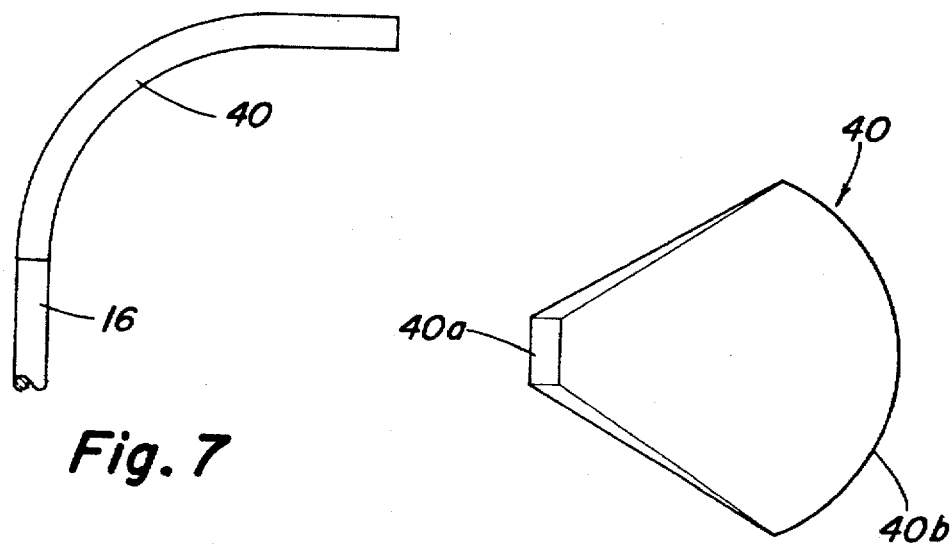
Fig. 7
Fig. 7A

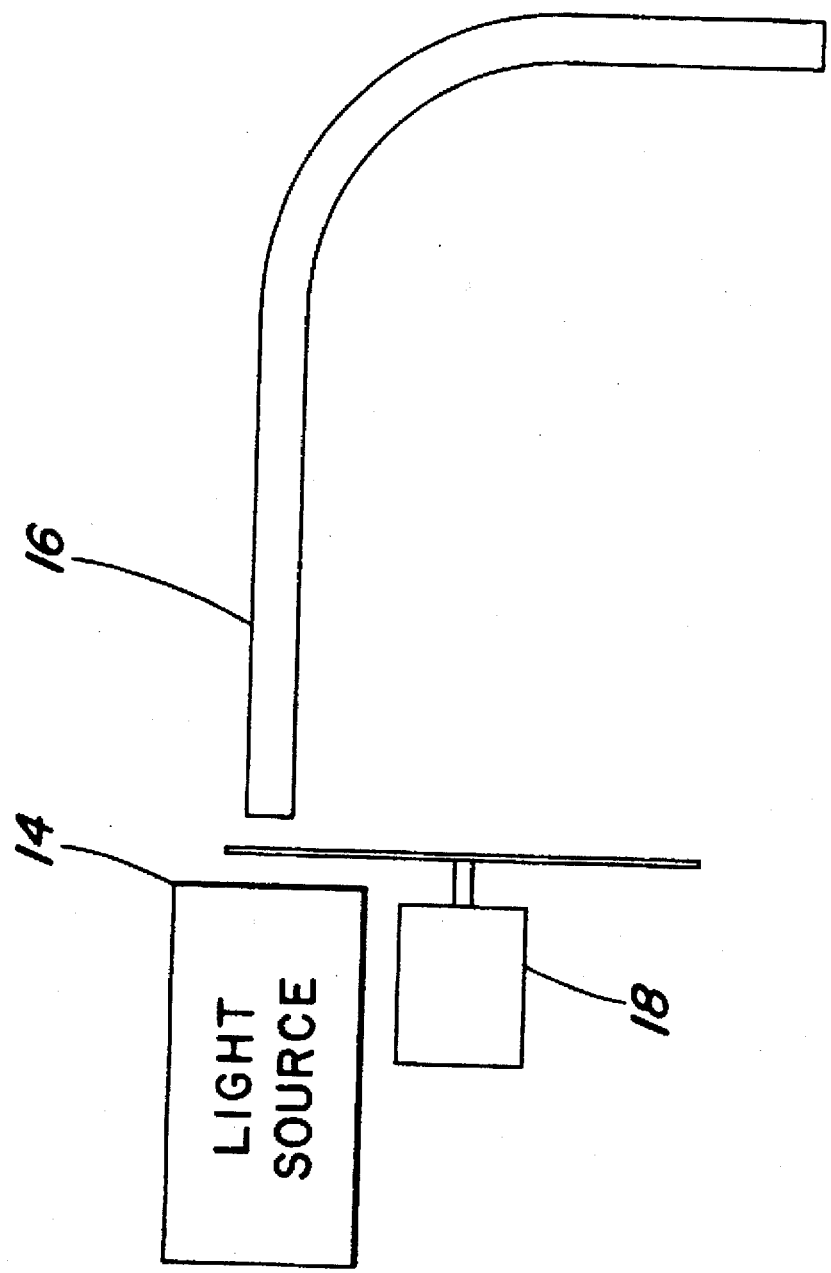

COMPACT UNIFORM BEAM SPREADER FOR A HIGH BRIGHTNESS CENTRALIZED LIGHTING SYSTEM

CROSS REFERENCE TO RELATED APPLICATIONS

This application is being filed contemporaneously with the following related applications: "Flashing Lighting System Using a Discharge Light Source" (attorney Docket No. LD 10796) filed in the name of Joseph M. Allison et al, and "System and Method for Broadcasting Colored Light for Emergency Signalling" (Attorney Docket No. 63006) filed in the name of J. L. Williams et al.

1. Field of the Invention

This invention relates to a compact uniform beam spreader as can be utilized in conjunction with a high brightness centralized lighting system that transmits light to various locations by means of optical fibers or light pipes. More particularly, this invention relates to such a beam spreader device as can be utilized to achieve a uniform beam pattern light output for applications to such product areas as emergency flashing light units, beacon lighting or display lighting where it is desired to have a long, somewhat narrow beam pattern that is essentially continuous in appearance.

2. Background of the Invention

The use of a centralized light source for providing light output to locations remote from the light source via optical fibers, has been proposed for a number of different applications including automotive forward lighting as well as display lighting for merchandising operations. Examples of a centralized lighting application in the automotive field can be found in U.S. Pat. Nos. 5,257,168 and 5,278,731 both of which are issued to Davenport et al on respective dates of Oct. 26, 1993 and Jan. 11, 1994, and both of which are assigned to the same assignee as the present invention. In these patents it can be seen that once the problem of providing a centralized lighting system having sufficient brightness to provide light output to a plurality of optical fibers has been solved, there are additional remaining problems to be solved. For instance, there is the problem of shaping the light output in a manner to meet regulatory requirements such as the beam spread pattern for high and low beam forward illumination of automobiles; each of the above patents provides a separate solution for this problem. Additionally, as seen in U.S. Pat. No. 5,341,445 issued to Davenport et al on Aug. 23, 1994 and assigned to the same assignee as the present invention, there is the added problem of efficiently coupling the light output to the optical fibers that must be addressed. In patent U.S. Pat. No. 5,341,445, a polygonal shaped optical coupler member is used to provide coupling from the light source to the input ends of a plurality of optical fibers in a manner such that the light has substantially uniform characteristics in terms of color and intensity.

In addition to automotive forward lighting applications, there are other applications which require a beam pattern that is wide in one dimension and narrow in the other. An example of such an application would be for emergency vehicle lighting such as an ambulance. In this application, industry standards require that the light beam output be spread horizontally from each light position by plus and minus 45 degrees and that such beam spread be substantially continuous; that is, there should be no null spots. In a centralized lighting system, the light output is typically in the form of a cone of light and if a simple cylindrical lens is utilized, the cylindrical lens will collimate the light in one direction only. In such an instance, the height of the lens, that is, the axis with collimation, is the same as the width of the lens (the axis without collimation).

Of additional consideration when designing an optical delivery system for use in emergency vehicles, is the size of such an system. In order to provide a lighting system with output optics that are of a reduced size so as to be more readily adaptable to various lighting applications, it has been found that by using an output optical coupling device which utilizes total internal reflectance (TIR), the width of such optical coupling device can be reduced to the size of the illumination source. Such an optical coupling device or optical coupler, can shape the light emitted from the optical fiber used to transmit the light output to the locations remote from the light source.

TIR converters provide better beam patterns when the light presented to the input end of the converter has uniform height. When the light input to the TIR converter is not of a uniform height, null spots appear in the output of the converter and, as previously discussed relative to the requirements for emergency vehicles, the light output of such a flashing light system must be continuous across a beam spread of plus and minus 45 degrees. In order to understand the phenomena of the null spots, it should be considered that the output surface of such a converter "images" a plane in space and, if such plane were the input face of the TIR converter, then any areas that were not filled in would show up as null spots in the output distribution. One way of achieving a uniform height illumination is by use of a converter device such as is described in the previously referenced U.S. Pat. No. 5,341,445 whereby the cross-sectional area of a light pipe is effectively modified so as to exhibit a polygonal output shape of the coupler. One problem with the use of the polygonally shaped coupler member to achieve a uniform height illumination is that such coupler results in light output that has associated therewith, an increase in angular distribution. Any coupler device should be designed so that changes in angular distribution does not result in wasting light. Accordingly, it would be advantageous to provide an optical coupling device that could be utilized in emergency vehicle applications or other beacon or flashing types of applications in a manner such that a continuous light output is achieved across an appropriate range of angles and wherein the overall lighting system does not exhibit light output that has an increased angular distribution of light output in the vertical direction.

Of further consideration when designing an emergency lighting system for use in ambulance and law enforcement vehicles is the need to show different color light outputs. Presently, when an emergency vehicle allows for showing a red flashing light sequenced with a white flashing light for instance, such changing light appearance is achieved by use of separate light sources for each different color. In such an arrangement, it is understood that the additional light sources add cost as well as require additional mounting space. In order to achieve the different colors without such cost and space disadvantages, it has been proposed that a color wheel be inserted between the light output from a centralized light source and the optical converter used to shape the beam pattern. By adding such a color wheel however, it is necessary to provide an air gap between the output end of the optical fiber and the input face of the optical converter. Such an air gap has the disadvantage of reintroducing the null spot problem discussed above. In attempting to again solve the null spot problem, reconfiguring the side wall portions of the optical converter would not be a solution for two different reasons. If the side wall portions of the optical converter were to be tapered inward, that is, if the input end were made larger than the output end of the converter, the null spots could be partially filled in but at the expense of the width of the beam pattern being significantly reduced from the required plus and minus 45 degrees. On the other hand, if the side wall configuration of the optical converter were tapered outward, that is, the output end were made larger than the input end, the width distribution would widen again but the null spot problem would be significantly increased. Accordingly, it would be advantageous if a centralized lighting system and optical distribution arrangement were provided that allowed for the use of a color wheel insertion to achieve different color outputs but without creating null spots and without reducing the width of the output beam pattern.

SUMMARY OF THE INVENTION

The present invention provides a compact uniform beam spreader for use with a centralized lighting system applied in an emergency vehicle type of arrangement wherein the beam spreader allows for the insertion of a color wheel either between the output of the optical fibers associated with the centralized lighting system and the input face of the optical converter responsible for shaping the beam pattern or at the point where light is output from the light source. Moreover, the present invention provides such a compact uniform beam spreader that achieves such differing color output using a single light source and a beam spreader that spreads the light output to approximately plus or minus 45 degrees from a central point and does so without experiencing null or blank spots in the light output. In other words, the light output is essentially continuous across the range of light output needed for emergency vehicle lighting applications.

In accordance with the provisions of the present invention, there is provided, a uniform compact beam spreader for use with a centralized lighting system having a centralized light source and optical fibers extending therefrom so as to distribute light output to locations remote from the light source. The compact beam spreading device has an input surface which is disposed in a spatially separated manner from an output surface of the optical fibers and has a width dimension associated therewith that can be related proportionally to the size of the light source. The side wall portions of the beam spreading device have total internal reflectance properties relative to light transmitted therethrough. An output surface of the beam spreading device is effective for outputting the light in an essentially continuous beam pattern which is substantially different in two orthogonal axes. For instance, for an emergency vehicle lighting application, with light output tightly controlled in the vertical direction, the beam spread in the horizontal direction extends over an output range of plus and minus 30 degrees from a center point. At least one of the input surface, the output surface or the side wall surface is configured in a curved manner such that the essentially continuous beam pattern over the stated output range is achieved. In such instance, the surface that is not curved is essentially a collimating lens.

In an important embodiment of the invention, the arcuately shaped portion of the beam spreading device that accomplishes the mixing of the light so as to achieve the continuous beam spread pattern, is provided by means of curving the side wall portion of the beam spreading device.

BRIEF DESCRIPTION OF THE DRAWINGS

In the following detailed description, reference will be made to the attached drawings in which:

FIGS. 6 and 6A are an elevational view in section and a top view of a beam spreading device constructed in accordance with a fourth embodiment of the present invention;

FIGS. 7 and 7A are an elevational view in section and a top view of a beam spreading device constructed in accordance with a fifth embodiment of the present invention.

FIG. 8 is an elevated view of an alternate location for a color wheel device.

DETAILED DESCRIPTION OF THE INVENTION

Figure 1:
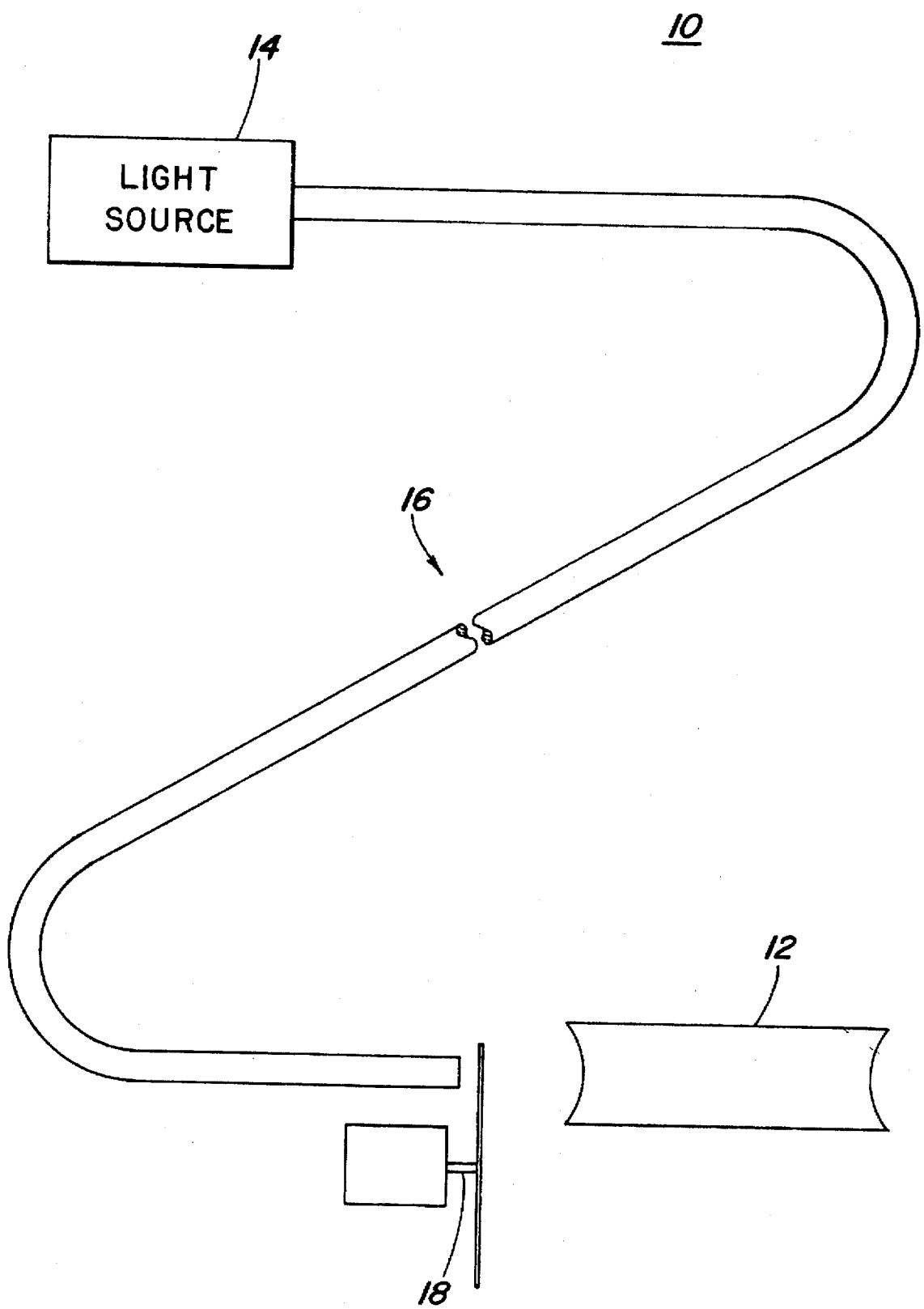
FIG. 1 is an elevational view in section of a centralized lighting system having the beam spreading device of the present invention disposed at the output end thereof.

As seen in FIG. 1, a centralized lighting system 10 that can be used in conjunction with the beam spreading device 12 of the present invention, includes a centralized lighting source 14 having contained therein, a high brightness light source such as is defined in U.S. Pat. No. 5,239,230 issued to Mathews et al. on Aug. 24, 1993. U.S. Pat. No. 5,239,230 is assigned to the same assignee as the present invention and is herein incorporated by reference. The high brightness light source of U.S. Pat. No. 5,239,230 along with an operating ballast circuit is packaged as a complete lighting system and is available commercially from GE Lighting under the product name of the Light Engine® lighting system. Optical fibers or light pipes 16 extend from the lighting source 14 to the beam spreading device 12 so as to allow for transmitting the light generated at the centralized source 14 to locations remote from the source. Interposed between the output of the optical fiber 16 and the input of the beam spreading device 12 is a color wheel 18 which for emergency vehicle lighting applications, allows the changing of colors from a single light source so as to achieve the necessary light "movement" needed for emergency vehicles to catch the attention of other drivers and pedestrians. Of course it can be appreciated that the beam spreading device 12 of the present invention can be used directly off of the light source 14 without the need for intervening optical fibers and that such configuration is within the scope of the present invention.

Figure 2:
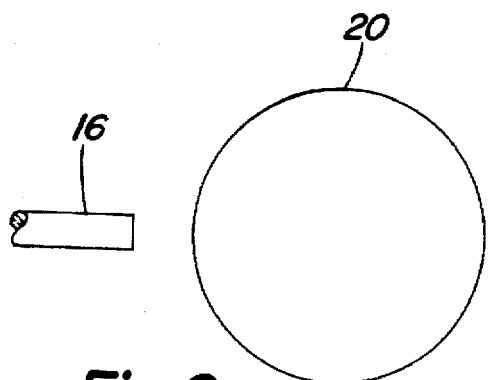
FIGS. 2 and 2A are an elevational view in section and a top view of a beam spreading device constructed using only a TIR converter.
Figure 2A:
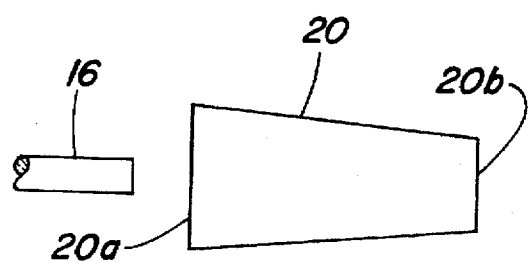

In a lighting application in which it is desired to provide a beam pattern light output which has a controlled, predefined height associated therewith and is spread across a wide band in the horizontal direction, an optical beam spreading device such as is shown in FIGS. 2 and 2A might be utilized. Such a device however would suffer in terms of there being a significant number of null spots in the output beam pattern, such null spots being defined as those portions of the output beam pattern in which light output is zero or substantially reduces so as to give an appearance of being discontinuous across the desired band of light output. The beam spreading device 20 previously known in the art, is a total internal reflectance (TIR) converter which is tapered so as to have a larger input end 20a than output end 20b. Such a configuration has been shown to experience null spots in the light output which, for certain applications such as will be described below in further detail, are unacceptable. If the angle of the taper were to be reversed, that is, if the output surface 20b were to be made larger than the input surface 20a, the result would be a reduction in the width of the output beam pattern, a result which would also be unacceptable in certain applications.

Figure 3:
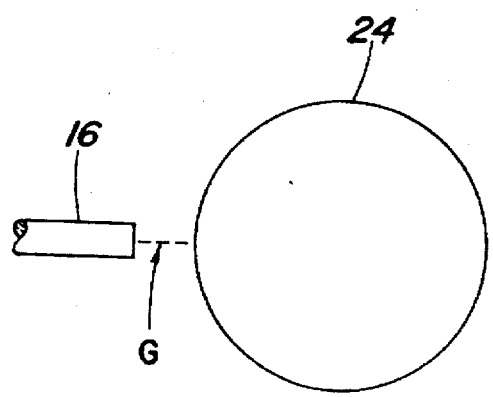
FIGS. 3 and 3A are an elevational view in section and a top view of a beam spreading device constructed in accordance with a first embodiment of the present invention.
Figure 3A:
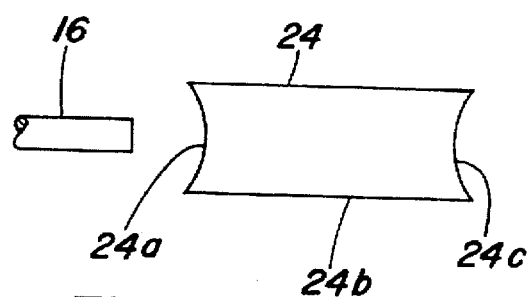

Referring now to FIGS. 3 and 3A, the beam spreading device 24 of the present invention is essentially disk-shaped and the light output from the optical fiber 16 is introduced after a gap G to an input surface 24a formed along the edge of the beam spreading device 24. The top and bottom surfaces 24b of beam spreading device 24 have total internal reflectance properties for the beam spreading device 24. Additionally, an output surface 24c is formed along the edge of the disk-shaped beam spreader device 24 opposite to the edge on which the input surface 24a is formed. As seen in FIG. 3A, both the input surface 24a and output surface 24b are formed in a curved arcuate manner. By this configuration, a uniform, continuous beam pattern is formed so as to be projected out from the output surface 24c. For an emergency vehicle lighting application, the beam pattern of the light output must have a continuous appearance across an output range of approximately plus and minus 45 degrees relative to a center point. Additionally, such beam pattern light output should have a sharp upper and lower cutoff appearance thereby requiring that the height of the beam pattern be controlled as well. The beam spreading device 24 of FIGS. 3 and 3A achieves this beam pattern by virtue of the arcuately curved input and/or output surfaces 24a and 24c. Of course, it should be understood that the light mixing properties of the arcuately curved input and output surfaces 24a, 24c would each be sufficient to achieve the continuous beam pattern output that is required of emergency vehicle lighting and therefore, the present invention would be operative with only one of such surfaces being formed in the arcuately curved manner. It is important merely to understand that to achieve the continuous beam pattern output, a significant amount of mixing of the light within the beam spreader device 24 is required. Additionally, it is important that the beam spreader device 24 increase the number of reflections off of the walls in as short a distance as possible.

Figure 4:
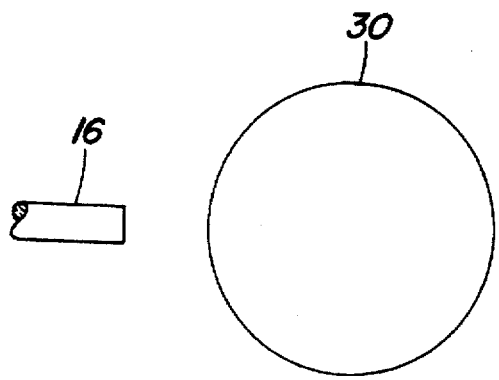
FIGS. 4 and 4A are an elevational view in section and a top view of a beam spreading device constructed in accordance with a second embodiment of the present invention.
Figure 4A:
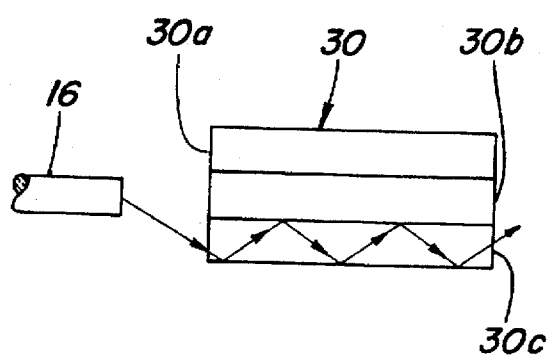

Another embodiment of a beam spreading device which achieves the desired beam pattern light output for emergency vehicle types of lighting applications can be seen in FIGS. 4 and 4A. Similar to the beam spreading device 24 of FIGS. 3 and 3A, the beam spreading device 30 of FIGS. 4 and 4A is disk-shaped. However, rather than utilize the arcuately curved input or output surfaces to achieve the light mixing within the spreader device 30, FIG. 4A illustrates that such light mixing is accomplished by use of a plurality of sliced segments 30a, 30b, and 30c. Each of the sliced segments 30a, 30b, and 30c would have the total internal reflectance properties for each segment. In this manner, the significant light mixing that is needed to achieve the continuous beam pattern light output is achieved by shortening the width of each segment as compared to that of the overall device. The shortened width thereby results in each light ray travelling a shorter distance before it bounces off of a reflective surface and thus allows for a significantly greater number of bounces within the beam spreading device to achieve the necessary light mixing.

Figure 5:
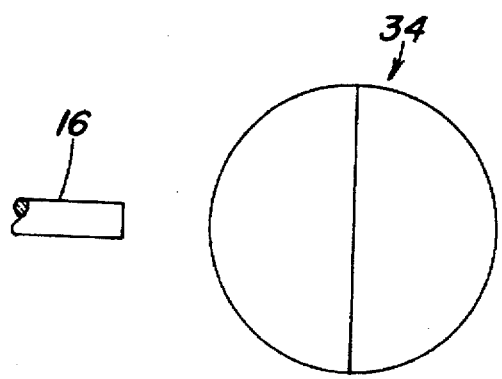
FIGS. 5 and 5A are an elevational view in section and a top view of a beam spreading device constructed in accordance with a third embodiment of the present invention.
Figure 5A:
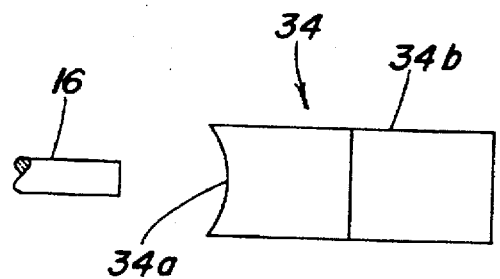

As seen in FIGS. 5 and 5A, another embodiment of the beam spreading device allows that only the input surface 34a have the arcuately formed surface so as to achieve the proper amount of light mixing. By this configuration, the output surface will occupy a different segment of the overall beam spreading device 34, which segment is joined to the front segment 34a having the input surface formed thereon.

FIGS. 6 and 6A illustrate yet another embodiment of the beam spreader device 36 which utilized a beveled edge 36a, 36b for the input and output surfaces. The beveled edges 36a, 36b serve the same purpose as the arcuately curved surfaces of FIGS. 3 and 3A in mixing the light through the beam spreading device 36. In this embodiment, a tapered coupler 38 can be attached to the output of optical fiber 16. The tapered coupler 38 can be a non-imaging optical coupler that performs an angle to area conversion.

Referring now to the beam spreading device 40 of FIGS. 7 and 7A, it can be seen that the light mixing is achieved by means of arcuately shaping the actual body of the beam spreading device 40 rather than either of the input or output surfaces. By making the turn tight enough, light that is input from optical fiber 16 to input surface 40a is significantly mixed in color and angular separation of colors is minimized prior to such light being output through output surface 40b in the desired beam pattern light output. Additionally, as seen in FIG. 8, the color wheel device 18 can he inserted at a point just as light is output from light source 14.

As previously discussed relative to FIG. 1, a color wheel would be one way to achieve the necessary light "movement" that catches the eyes of drivers and pedestrians. Another approach for providing the light movement could be employed using the beam spreading device 34 of FIG. 5. In this instance, one of the segments 34a or 34b could be moved relative to the other to achieve the necessary appearance of moving light.

Although the hereinabove described embodiments constitute the preferred embodiments of the invention, it should be understood that modifications can be made thereto without departing from the scope of the invention as set forth in the appended claims. For instance, a reflective coating could be used on the various surfaces of the beam spreader devices in place of the TIR properties provided herein. Additionally, the various shapes of the beam spreader devices need not be restricted to disk-shaped structures. This was used because of the availability of circular bar stock of suitable converter material that could be sliced to achieve the disk-shaped configuration illustrated herein. Yet another modification would involve modifying the profile of the beam spreading device 40 shown in FIG. 7. In such a modification the input end need not be reduced in height but could be of the same height as the output surface. In this manner, the additional surface area could be used for mounting the beam spreader device on an emergency vehicle.

What is claimed is:

1. A uniform compact beam spreading device for use with a centralized lighting system having a centralized light source and optical fibers for delivering light output to locations remote from the light source, said compact beam spreader device comprising:

an input surface disposed in a spatially separated manner relative to an output surface of at least one of the optical fibers, said input surface having a fixed width dimension associated therewith;

side wall portions having total internal reflection properties relative to light transmitted through said beam spreading device;

an output surface through which light is output in a predetermined beam pattern, said predetermined beam pattern being essentially continuous across an output range of greater than plus and minus 30 degrees from a center point and further having a predetermined height dimension associated therewith; and, wherein at least one of said input surface and said output surface is configured in an curved manner so as to achieve such essentially continuous beam pattern over said output range.

2. A beam spreading device as set forth in claim 1 wherein a color wheel is disposed near said beam spreading device and is effective so as to provide at least two different color light outputs from said beam spreading device.

3. A beam spreading device as set forth in claim 2 wherein said color wheel is disposed between the output of said optical fiber and said input surface of said beam spreading device.

4. A beam spreading device as set forth in claim 1 wherein said side wall portions are configured in a parallel relation to one another and both said input surface and said output surface are configured in an arcuately curved manner.

5. A beam spreading device as set forth in claim 1 wherein said output range of said beam pattern is approximately plus and minus 45 degrees from a center point and said beam pattern is essentially continuous throughout such plus and minus 45 degree output range.

6. A beam spreading device as set forth in claim 1 wherein side wall portions are essentially disk-shaped.

7. A beam spreading device as set forth in claim 1 wherein said beam spreading device is constructed having multiple segments, at least two of which are moveable relative to one another, one of said multiple segments having said input surface formed thereon and another of said multiple segments having said output surface formed thereon, said one multiple segment being moveable relative to said another multiple segment thereby providing that light output from said output surface can simulate movement of light in the nature of an emergency light for a vehicle.

8. A beam spreading device as set forth in claim 7 wherein said curved configuration is formed on said one segment on which said input surface is formed.

9. A beam spreading device for use with a centralized lighting system having a high brightness light source and reflector arrangement for focussing light output to an optical focal point of the reflector, said beam spreading device comprising:

a disk-shaped solid converter having side surfaces which are coated so as to achieve total internal reflectance properties;

an input surface formed on one edge of said solid converter, said input surface being receptive of such light output from said light source and reflector arrangement;

an output surface formed on an edge of said solid converter opposite to said one edge on which said input surface is formed, said output surface being effective for outputting a beam pattern which is substantially different in two orthogonal axes and which is spread in the horizontal direction;

wherein at least one of said input surface, said output surface and said solid converter are configured in a manner so as to mix light thereby achieving such essentially continuous light output; and wherein at least one of said input surface and output surface which is not configured in a curved manner, is substantially a collimating lens.

10. A beam spreading device as set forth in claim 9 wherein said solid converter is constructed having a plurality of disk slices joined side to side and wherein each of said disk slices is coated so as to achieve such total internal reflectance properties.

11. A beam spreading device as set forth in claim 9 wherein said input surface is formed in an arcuate manner and is thereby effective in achieving such essentially continuous light output.

12. A centralized lighting system for providing a beam pattern light output which is essentially continuous over an output range of greater than plus and minus 30 degrees from a center point and which beam pattern light output can be altered so as to simulate emergency vehicle lighting, said centralized lighting system comprising:

a high brightness light source and reflector assembly effective so as to generate a focussed light output;

a beam spreader device receptive of said focussed light output, said beam spreader device having an input surface, side wall portions coated so as to achieve total internal reflectance properties, and an output surface through which said beam pattern light output is transmitted;

means for altering said beam pattern light output so as to simulate emergency vehicle lighting; and, wherein at least one of said input surface, output surface and side wall portions of said beam spreader device is configured so as to mix light within said beam spreader device so as to achieve such essentially continuous beam pattern light output.

13. A centralized lighting system as set forth in claim 12 further comprising at least one light pipe for transmitting light output from said light source and reflector assembly to a location remote therefrom, said beam spreader device being disposed at such remote location and being receptive of light output from an output end of said light pipe.

14. A centralized lighting system as set forth in claim 12 wherein said altering means includes a color wheel disposed near said beam spreader device.

* * * * *